April 14, 1931.          R. R. HOLDEN          1,801,083
TROLLEY EAR
Filed Dec. 7, 1929
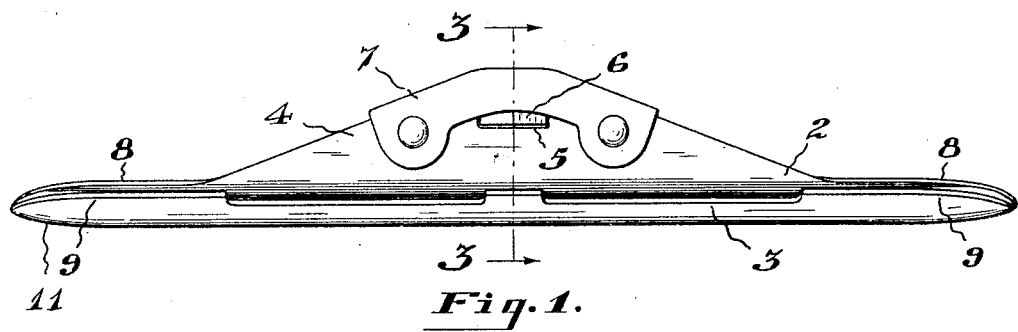
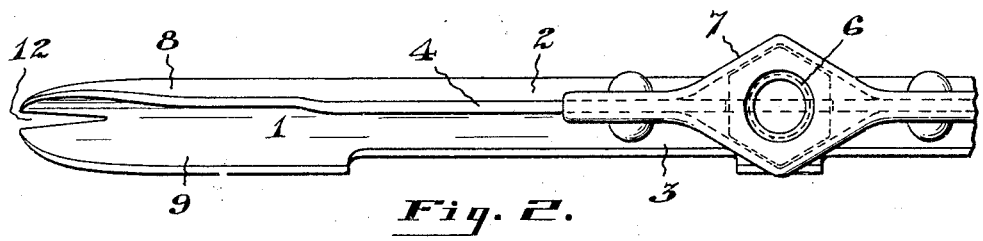
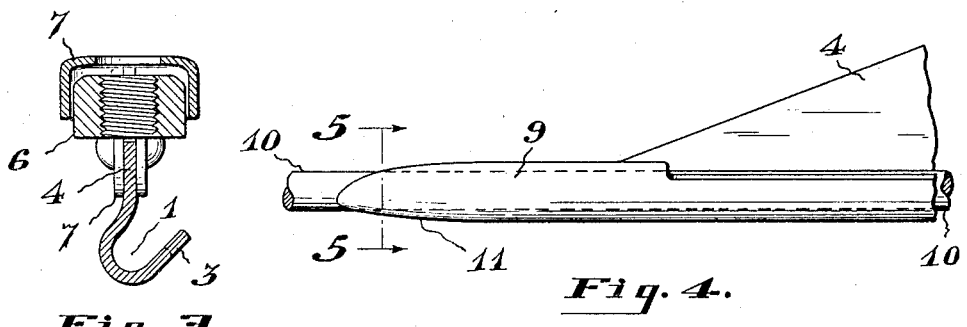
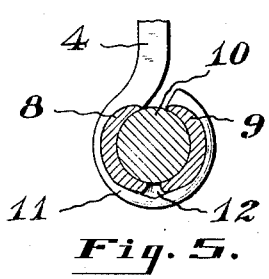
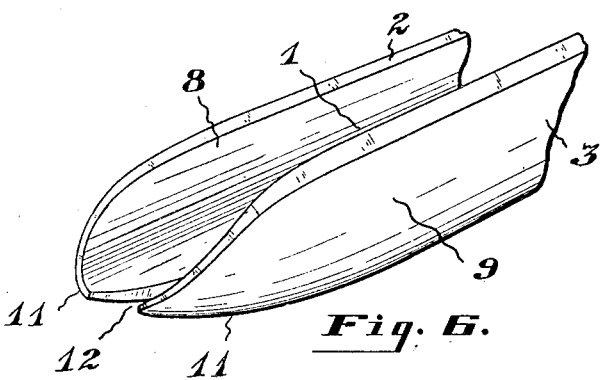
INVENTOR
*Richard Roy Holden*
BY
*Evans & McCoy*
ATTORNEYS Patented Apr. 14, 1931

1,801,083

UNITED STATES PATENT OFFICE

RICHARD ROY HOLDEN, OF HIGHLAND PARK, ILLINOIS

TROLLEY EAR

Application filed December 7, 1929. Serial No. 412,313.

This invention relates to supports for overhead trolley wires such as trolley ears, clinch ears and approaches, and more particularly to supports of the type disclosed in my co-pending application Serial No. 295,267, filed July 25, 1928, in which the wire holding portion is formed by bending or stamping a piece of sheet copper in the form of a trough of a size suitable to receive the trolley wire, the end portion of the trough being provided with side flanges adapted to be bent over the wire to secure the same in the trough.

It has been found that when the side flanges of the trough are peened over a trolley wire, there is a tendency to distort the end portion of the trough, causing the end of the trough to dip down so that in service, the wire at the end of the trough is subjected to excessive peening action in the passage of trolleys which tends to flatten and weaken the wire at this point.

The present invention has for its object to provide a wire support or holder which has a trough shaped wire receiving portion so constructed at the ends of the trough that it may be peened over the trolley wire without distorting the trough or trolley wire enabling the wire to be tightly gripped and held straight in the trolley ear.

With the above and other objects in view, the invention may be said to comprise the trolley ear as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a side elevation of a trolley ear embodying the invention.

Fig. 2 is a fragmentary top plan view showing one end of the trolley ear on an enlarged scale.

Fig. 3 is a section taken on the line indicated at 3—3 in Fig. 1.

Fig. 4 is a fragmentary side elevation showing one end of the trough shaped portion of the trolley ear applied to a trolley wire.

Fig. 5 is a section taken on the line indicated at 5—5 in Fig. 4.

Fig. 6 is a perspective view of one end of the wire receiving trough.

The present invention is herein illustrated as applied to a trolley ear which is formed from a plate of suitable metal such as rolled copper and is provided with a wire receiving trough 1 having side flanges 2 and 3. The side flange 2 has an upstanding central portion 4 which has at its center a notch 5 extending downwardly from its upper edge, which is of a width just sufficient to receive a nut 6, which is held in place in the notch by means of a metal retaining clip 7 attached to the upstanding portion 4 of the flange and formed with a recess on its under side of polygonal form within which the nut 6 fits and by means of which the nut is held against rotation so that a suitable hanger may be screwed into the nut. The side flanges 2 and 3 are provided with end portions 8 and 9 which are adapted to be bent inwardly around a trolley wire 10 in the trough by peening or other suitable means to firmly grip the wire and hold the same in the trough.

As clearly shown in Figs. 2 and 6, the metal of the trough is gradually reduced in thickness toward the end of the trough and as clearly shown in Figs. 1, 4 and 6, the bottom of the trough has upwardly curved portions 11 at the ends thereof. The upwardly curved portions 11 tend to straighten out as the flanges 8 and 9 are peened over the trolley wire 10 so that the bottom of the trough is substantially straight at the ends thereof after the flanges have been bent into gripping engagement with the wire. While the downward distortion of the ends of the trough may be compensated for by the upward curve of the bottom of the trough at the ends, it is preferred to insure against any distortion by providing in each of the upwardly curved end portions of the bottom of the trough, elongated V-shaped notches 12 extending inwardly from the end of the trough.

These notches permit the opposite side flanges of the trough to be peened over the wire and permit the trough to be peened to cylindrical form about the trolley wire without setting up any stresses in the end of the trough tending to deform the same or to bend the trolley wire, the V-notches 12 providing a space along the under side of the wire between the opposite side portions of the trough so that the side portions of the trough at the ends thereof are free to bend into conformity with the surface of the wire without setting up stresses therein tending to force any part of the trough wall away from the surface of the wire, as the trough is peened into conformity with the trolley wire.

It will be apparent that the present invention provides a very simple and economical trolley ear construction which greatly simplifies the attachment of the trolley ear to the trolley wire and which eliminates any possibility of so distorting the trough shaped portion of the trolley ear or the trolley wire as to subject the wire to excessive wear at the ends of the trolley ear.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A trolley wire support comprising a trough shaped body portion adapted to receive a trolley wire, said trough shaped body portion having suspension means and side flanges at an end thereof adapted to be bent over the wire to hold the same in place, the bottom of the trough shaped body portion having an upwardly curved outer end portion gradually decreasing in thickness toward the end edge, the upwardly curved end portion of the bottom of trough having a notch extending inwardly from the end thereof.

2. A trolley wire support comprising a trough shaped body portion adapted to receive a trolley wire, said trough shaped body portion having suspension means and side flanges at an end thereof adapted to be bent over the wire to hold the same in place, the bottom of the trough shaped body portion having an upwardly curved outer end portion gradually decreasing in thickness toward the end edge, the upwardly curved end portion of the bottom of the trough having an elongated V-shaped notch extending inwardly from the end thereof.

3. A trolley wire support comprising, in combination, a trough-shaped sheet metal body portion arranged to receive a trolley wire, means for suspending said body portion, flanges on said body portion arranged to be bent over the trolley wire to hold the same in place, said body portion being curved upwardly at its ends whereby the ends of said body portion may be peened about the trolley wire to provide a smooth running surface for contact with a trolley.

4. A trolley wire support comprising, in combination, a sheet metal body portion, means for suspending said body portion, the metal of said body portion being bent to provide a trolley wire receiving trough curving upwardly adjacent its ends, the metal of said body portion being tapered in thickness adjacent the ends of said trough, said body portion having flanges adjacent the ends thereof arranged to be bent around the trolley wire, said trough construction permitting the body portion to be peened about the trolley wire to provide a smooth continuous surface for contact with a trolley.

In testimony whereof I affix my signature.

RICHARD ROY HOLDEN.